United States Patent Office 3,334,334
Patented Aug. 1, 1967

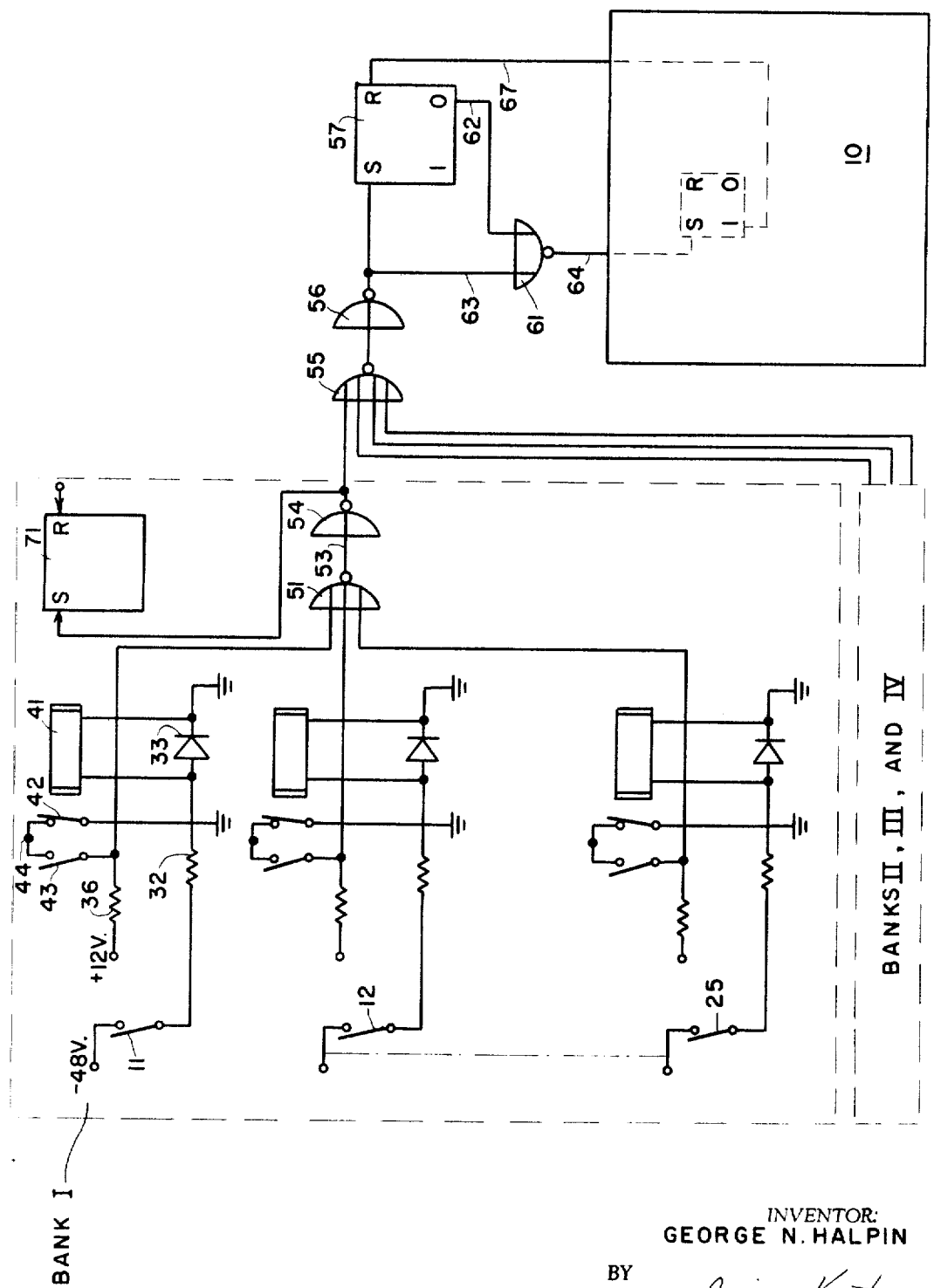

3,334,334
SIGNAL CHANGE DETECTOR FOR PROCESS CONTROL COMPUTER
George N. Halpin, Newport, England, assignor to General Electric Company, a corporation of New York
Filed July 26, 1963, Ser. No. 297,786
14 Claims. (Cl. 340—172.5)

This invention relates to control means useful in monitoring a process which is under the automatic control of a digital computer, and particularly wherein the magnitude of the response within the process, to the controls imposed upon the process, are time sensitive and even critical.

A process control digital computer is part of a control system wherein the real or actual times of response to, and execution of, the steps of the process are of fundamental significance in the control system itself. This is unlike the typical computational or other data handling applications of digital computers which do not function in real time and wherein there is no necessary correspondence between the time domain of the digital computer and the time requirements of the data being processed.

In a process under automatic control, e.g., a chemical manufacturing process or electric power distribution plant, it is essential to promptly be able to apply initiating or perhaps corrective and remedial control actions to the process when the status of the process so requires. For this reason, various parameters of the controlled process are continually monitored by various monitoring devices and sensors. The condition or state of a sensor may require a branching action in the computer. Thus, for example, the main program may require interruption so that a sub-routine or sub-program may be carried out when the state of the sensor indicates that some type of control action is needed.

In certain process control computer applications, however, there is no need at all to read or monitor the sensing devices unless the magnitude of the parameter of interest has reached or exceeded a critical limit. For example, it is sometimes the case that variable conditions in the process, such as temperature and pressure in a steam turbine, speed of rotation of an electric generator, or the neutron flux density in a nuclear reactor, and so forth, must be sensed to the end that if these parameters reach a critical value, appropriate action may be taken. In such situations, a limit switch, for example, or other electrical contact, may change its logic state, when the sensed parameter reaches its critical value. As long as these critical values are not reached, or exceeded, as the case may be, the process is proceeding in a range of parameter magnitudes requiring no special action. Consequently, to interrupt the master program except when an electrical contact, responsive to a sensor, has changed state represents an unnecessary delay in the operation of the process control computer.

To properly monitor all of the parameters of interest through the monitoring of the multiplicity of electrical contacts, it is important that a change in the state of any one o rmore of the contacts be detected, whatever the change may be, and that it be detected immediately so that the computer may branch to an appropriate sub-routine for appropriate action. The prior art approach to monitoring these contacts involves sensing the present states of the switches and comparing them with their prior states stored in a memory device, e.g., a magnetic drum. If the comparison of states shows a difference, then some type of corrective action should be taken. The comparison of the previous and present states of a binary device may be accomplished by the application of these states to an exclusive OR logic circuit which will provide an output only if one of the two states is different from that of the other. This comparison technique is well known in the art and an especially advantageous form of exclusive OR logic circuit used in conjunction with a digital full adder is disclosed, for example, in the copending application by Richard M. Berlind, entitled, "Digital Full Adder With Special Logic Functions," Ser. No. 291,166, filed June 27, 1963, now Patent Number 3,317,721 issued May 2, 1967.

In accordance with the techniques of the prior art, the master program is designed so that the program is interrupted periodically and frequently and the electrical contacts inspected by an inspection sub-routine during the interruption so as to ascertain whether any of the contacts has changed state. The interruptions must be frequent, since if a contact (which may be on a limit switch) has changed state, corrective action must be taken immediately. However, if the process is proceeding properly, it may go on indefinitely without any limit switch changing state. Furthermore, the change of state of a contact during the process is clearly unpredictable, and certainly asynchronous. It is an inefficient use of a process control computer, therefore, to have to frequently and periodically interrupt the master program sequence to carry out electrical contact inspection sub-routines.

It is therefore an object of this invention to provide improved apparatus in a process control computer system for detecting any change in state of a process parameter and initiating performance of an appropriate sub-program in the system.

It is another object of this invention to provide electrical contact inspection during the operation of a process control digital computer only after at least one contact has actually changed state.

These objects have been accomplished, in accordance with the principles of the invention, in a system wherein the transient state of a relay contact is used to detect a change in state of an electrical contact responsive to a parameter of interest in the controlled process. In the illustrated embodiment of the invention a make-before-break contact relay is disposed in series with each contact. As a contact is in the process of opening or closing, the make-before-break or D contact relay momentarily closes the circuit so as to send forward a signal indicating that the parameter contact actuating the form D contact relay is changing state. This signal is transposed to a logic level signal used as an input interrupt signal to an automatic program interrupt circuit which interrupts the master program to permit commencement of an appropriate sub-routine. However, since there may be hundreds of parameter contacts in the system, before any sub-routine providing compensatory or remedial action is instituted, it must first be ascertained which one or more of the contacts has changed state. Logic circuits are provided such that with the interruption of the master program, and the generation of an interrogation signal, the circuitry indicates in which group or bank of contacts is located the one which has changed state. When this is ascertained, the one or more contacts which have changed state are identified by comparison of the past and present states of that group of contacts; this is accomplished by exclusive OR circuitry in manner well known in the art and as described in a particularly advantageous arrangement in the above-mentioned copending application entitled, "Digital Full Adder With Special Logic Functions."

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawing.

In the drawing there is represented a combined schematic and logic circuit representation of a signal change detector in accordance with the principles of the invention.

The signal change detector system, in accordance with the principles of the invention, is contemplated as part of a process control digital computer. However, only the signal change detector system is described below, it being understood that it is incorporated in an overall digital computer functioning for process control applications.

The signal change detector system comprises two sub-systems. The first sub-system is the automatic master program interrupt system which cooperates with the second sub-system which is the contact detector apparatus whose output constitutes an interrupt signal input to the program inerrupt circuit.

The automatic master program interrupt system is represented in the drawing by block 10. Automatic program interrupt systems as such are well known in the art and a particularly appropriate one is disclosed, for example, in U.S. Patent No. 3,077,984, by R. R. Johnson, entitled, "Data Processing System," which issued Feb. 19, 1963. The automatic program interrupt system of that patent is incorporated in a large scale digital computer, and although not a process control computer as such, it is generally of the type contemplated for use with the instant automatic variable timing control invention. Particular attention may be had in that patent to the automatic read program interrupt description at columns 243 and 244 and to FIG. 243 of the drawings. Although it is not intended here to present a detailed description of an automatic program interrupt system, a brief general description of the operation of such a sub-system will be given to orient the reader relative to its function in the overall automatic variable timing control system.

The automatic master program interrupt system of block 10 is a circuit which enables the computer programer to provide, upon the occurrence of certain events, either internal or external to the digital computer, for branching to sub-routines or sub-programs, i.e., branching from the master program to a sub-program, to handle these events automatically. This means that these events may be handled without the insertion of quiz and branch commands throughout the master program; it also permits reentering the master program subsequent to the execution of the sub-routine without the loss of information or sequence. The logic circuitry of the automatic program interupt system serves to notify the digital computer of the presence of an interrupting signal condition. This permits, then, the interruption of the main program and the execution of the sub-routine.

Conditions applicable as automatic program interrupt inputs may be as varied as appropriate for the application of the digital computer. Thus, for example, automatic program interrupt conditions may include external alarm conditions such as over-temperature alarms, as well as internal indications from elapsed time counters or various signals represented by either contact closure signals or logic level signals.

The logic structure of the automatic program interrupt system essentially comprises a buffered storage register having as many bits of capacity, i.e., as many flip-flops, as there are permissible interrupt signals. In addition, there are control flip-flops and gating structure in conjunction with the buffered storage register for implementation of the interrupt function. The multiplicity of possible interrupt input signals may be subdivided into various groups having different priority levels such that a first priority interrupt signal will interrupt the master program and have its subroutine executed in preference to a lower priority interrupt signal simultaneously applied to the automatic program interrupt system 10. In any event, the main program is interrupted responsive to an input interrupt signal.

Considering the drawing in greater detail, there is represented an array of contacts 11 through 25 comprising fifteen sets of switch contacts in Bank I, although only contacts 11, 12 and 25 and their related circuits are shown in detail. In addition, Banks II, III and IV are represented as broken-line blocks with an output lead coming from each, but are in all details similar to Bank I. Although contacts 11–25 may themselves be limit switch or other types of parameter contacts, they are preferably the contacts of noble element contact relays with each relay actuatable by a limit switch parameter contact in circuit therewith. The parameter contacts are normally open and are each connected on one side to a negative potential source which may, in a specific application, be minus 48 volts.

In series with contact 11 is a resistor 32 coupling contact 11 to a mercury-wetted relay 41 shunted by a diode 33 with the cathode electrode of diode 33 grounded at its junction with the terminal of mercury relay 41. The circuits in series with contacts 12–25 are the same as those of contact 11. A change of state in switch contact 11 serves to actuate or de-energize mercury relay 41. Mercury-wetted relay 41 is of the type well known in the art and may have operating characteristics such as a five millisecond pickup time and seven millisecond drop-out time. Most importantly, it has form D contacts, i.e., the contacts are of the make-before-break type. The relay contacts for relay 41 are shown adjacent to relay 41 with contact 42 normally closed, and contact 43 normally open. One side of the normally closed contact 42 is grounded and the other side is coupled to normally open contacts 43 which in turn is connected through a resistor 36 to positive potential source, which in this application may be plus 12 volts. The junction point 44 of contacts 42–43 may be sensed to determine the status of contact 11. Junction 44 may be connected to logic circuitry (not shown) which functions to compare the past states of the contacts stored elsewhere, with the present states as represented, for example, by the condition of junction 44.

In series with contacts 42–43 is a NOR gate 51, one of whose inputs is connected to contact 43, and the others are derived from the rest of the parameter contact circuits of Bank I. All of the circuits of Bank I ultimately have an output which together constitute all of the inputs to NOR gate 51. In this NOR gate and the unsteered flip-flop to be described below, reference is made to binary one and binary zero logic signals, and also to the change in state from binary one to binary zero, as being the signals implementing the action of the components. It is often the case that the specific hardware, which mechanizes logic components such as these, requires the logic signals to be in the form of two voltage levels. Thus, the binary one logic state may be represented by zero volts or ground, while the binary zero logic state may be represented by a positive voltage, for example, plus 6 volts. Changing from the binary one to the binary zero state results in a voltage change from zero to plus 6 and makes available the leading edge of the plus 6 volt pulse. The logic NOR gate 51, which is well known in the art, provides the following logic function: there is a binary one output on the NOR gate output lead only if both the inputs are simultaneously in the binary zero logic state, and concomitantly, the output is in logic state zero if either input is in the binary one state.

It may be seen that in the operation of relay 41, the make-before-break or form D contact results in the input lead to NOR gate 51 being momentarily grounded during a change in state of contact 11; this is because relay 41 is actuated and contact 43 closes momentarily before contact 42 opens. As a consequence, the input to NOR gate 51 which monitors contact 11, is momentarily in the binary logic one state, since zero volts or ground represents the binary logic one signal. This, however, occurs only momentarily while relay 41 is being actuated, i.e., while the make-before-break function of contacts 42 and 43 is in process. With NOR gate 51 having at least one of its input leads in logic state one, its output, which is otherwise in logic state one, changes to logic state zero which is characteristic of NOR logic. Thus, the output lead 53 of NOR gate 51, when in the binary zero logic state, indicates that at least one parameter contact in Bank I is changing state. When the contact change has been completed, lead 53 once again reverts back to logic level one.

Output lead 53 of NOR gate 51 is then applied through inverter 54 to NOR gate 55, which has as its inputs similar leads from Banks II, III and IV. Thus, if one or more of the parameter contacts in any one of Banks I through IV changes state, at least one of the input leads to NOR gate 55 will be momentarily in the logic one state due to the mercury relay associated with that contact itself being in the process of having its contacts change state. For the brief period during which this change of mercury relay contact states is going on, therefore, the output of NOR gate 55 is in the binary zero state, which serves to set the unsteered flip-flop 57 through inverter 56. Flip-flop 57 functions as follows: the flip-flop is set by having a binary one input signal at input S, and is reset by a binary one signal at the reset input R. The outputs from the flip-flop in its set state are equal to binary one and binary zero at the one and zero output leads, respectively. The logic states of the one and zero output leads are reversed when the flip-flop is reset.

The logic zero output lead of flip-flop 57 is applied as one input 62 to NOR gate 61 while the output of inverter 56 is applied as the second input 63 to NOR gate 61. It follows, therefore, that lead 62 can only be in the zero state if flip-flop 57 has been set due to a change in state of one of the parameter contacts, somewhere in Banks I–IV, while input lead 63 is in the zero state only during the period of time when mercury relay contact changes are nowhere in progress. Accordingly, the output lead 64 of NOR gate 61 can only be in logic state one if a parameter contact has changed state and the change in state of its associated mercury relay has been completed. At all other times, output lead 64 must remain in the binary logic zero state. Lead 64, therefore, is applied as an input to the automatic program interrupt system 10. With a logic one signal on this lead, the automatic program interrupt process is carried out. An output from the automatic program interrupt is applied on lead 67, which in turn functions as the reset input to unsteered flip-flop 57. Reset of flip-flop 57 occurs immediately upon recognition by automatic program interrupt that a parameter contact has changed state, so that subsequent changes in state of other contacts may be taken care of and not be lost.

In order to avoid the necessity of comparing the past and present states of the contacts in all four Banks, it may be desirable to have an indication of which one or more of the four banks contains a contact that has changed state. Thus, a flip-flop 71 having its set input taken directly from inverter 54 is set when any one of the contacts in Bank I changes state. The same type of flip-flop is inserted in the same place in the circuits of Banks II, III and IV. Accordingly, inspection of those four flip-flops identifies which one or more of the four banks has had at least one of its contacts change state.

The use of a mercury-wetted relay in circuit with the switch contacts is additionally advantageous since mercury relays do not exhibit contact bounce and thus tend to filter out the bounce from the switch contacts when a change of state is being detected. Additional filtering can be obtained by the use of a suitable capacitor in parallel with the relay coil.

Although make-before-break mercury relays have been disclosed in the embodiment described above the transient state of break-before-make contact relays may also be used to detect a change in limit switch state. Thus, the momentary open state of a normally closed contact and a normally open contact may be used to detect the change.

While the principles of the invention have now been made clear in an illustrative embodiment, there will be immediately obvious to those skilled in the art many modifications in structure, arrangement, proportions, the elements, materials, and components, used in the practice of the invention, and otherwise, which are particularly adapted for specific environments and operating requirements, without departing from these principles. The appended claims are therefore intended to cover and embrace any such modifications, within the limits only of the true spirit and scope of the invention.

What is claimed as new and desired to be secured by Letters Patent of the United States is:

1. In a process control computer system wherein the main program may be interrupted by a subprogram in response to an interrupt signal, the combination comprising: signal source means for providing an output signal which changes between first and second states in response to corresponding predetermined changes in a selected parameter of the process being controlled by said computer system, change detection means connected to said signal source means for generating an interrupt signal in response to either change in state of the output signal of said signal source means, and means responsive to the interrupt signal generated by said change detection means for causing interruption of the main program and performance of an appropriate subprogram in the process control computer system.

2. In a process control computer system wherein the main program may be interrupted by a subprogram in response to an interrupt signal, the combination comprising: signal source means for providing an output signal having either a first or a second state, said output signal changing from the first to the second state in response to a predetermined change in a selected parameter of the process being controlled by said computer system and changing from the second to the first state in response to another predetermined change in the selected parameter, change detection means connected to said signal source means for generating an interrupt signal in response to either change in state of the output signal of said signal source means, and means responsive to the interrupt signal generated by said change detection means for causing interruption of the main program and performance of an appropriate subprogram in the process control computer system.

3. In a process control computer system wherein the main program may be interrupted by a subprogram in response to an interrupt signal, the combination comprising: signal source means for providing one of two possible output signals and for changing from the first output signal to the second in response to a predetermined change in a selected parameter of the process being controlled by said computer system and for changing from the second output signal to the first in response to another predetermined change in the selected parameter, change detection means connected to said signal source means for generating an interrupt signal in response to either change in the output signal of said signal source means, and means responsive to the interrupt signal generated by said change detection means for causing interruption of the main program and performance of an appropriate subprogram in the process control computer system.

4. In a process control computer system wherein the main program may be interrupted by a subprogram in response to an interrupt signal, the combination comprising: signal source means for providing an output signal having either a first or a second state, said output signal changing from the first to the second state in response to a predetermined change in a selected parameter of the process being controlled by said computer system and changing from the second to the first state in response to another predetermined change in the selected parameter, control means connected to said signal source means for generating a control signal in response to either change in state of the output signal of said signal source means, logic circuit means responsive to the control signal generated by said control means for providing an interrupt signal, and means responsive to the interrupt signal provided by said logic circuit means for causing interruption of the main program and performance of an appropriate subprogram in the process control computer system.

5. In a process control computer system wherein the main program may be interrupted by a subprogram in response to an interrupt signal, the combination comprising: electrical contact means which changes between first and second states in response to corresponding predetermined changes in a selected parameter of the process being controlled by said computer system, circuit means connected to said electrical contact means for momentarily generating a signal in response to either change in state of said electrical contact means, logic circuit means responsive to said signal generated by said circuit means for providing an interrupt signal, and means responsive to the interrupt signal provided by said logic circuit means for causing interruption of the main program and performance of an appropriate subprogram in the process control computer system.

6. In a process control computer system wherein the main program may be interrupted by a subprogram in response to an interrupt signal, the combination comprising: an electrical contact means which changes from a first to a second state in response to a predetermined change in a selected parameter of the process being controlled by said computer system and which changes from the second to the first state in response to another predetermined change in the selected parameter, circuit means connected to said electrical contact means for momentarily generating a signal in response to either change in state of said electrical contact means, logic circuit means responsive to said signal generated by said circuit means for providing an interrupt signal, and means responsive to the interrupt signal provided by said logic circuit means for causing interruption of the main program and performance of an appropriate subprogram in the process control computer system.

7. In a process control computer system wherein the main program may be interrupted by a subprogram in response to an interrupt signal, the combination comprising: electrical contact means which changes between first and second states in response to corresponding critical changes in a selected parameter of the process being controlled by said computer system, circuit means connected to said electrical contact means for momentarily generating a signal in response to either change in state of said electrical contact means, signal storage means for receiving and storing the momentary signal generated by said circuit means, logic means responsive to the output of said signal storage means for generating an interrupt signal, and means responsive to the interrupt signal generated by said logic means for causing interruption of the main program and performance of an appropriate subprogram in the process control computer system.

8. In a process control computer system wherein the main program may be interrupted by a subprogram in response to an interrupt signal, the combination comprising: program interrupt means for causing interruption of the main program and performance of an appropriate subprogram in the process control computer system, inhibit means for normally inhibiting the operation of said program interrupt means, electrical contact means which changes between first and second states in response to corresponding predetermined changes in a selected parameter of the process being controlled by said computer system, first circuit means connected to said electrical contact means for generating a signal in response to either change in state of said electrical contact means, and second circuit means responsive to said signal generated by said first circuit means for disabling said inhibit means.

9. In a process control computer system wherein the main program may be interrupted by a subprogram in response to an interrupt signal, the combination comprising: a plurality of signal source means, each of said signal source means providing an output signal which changes between first and second states in response to corresponding predetermined changes in a selected parameter of the process being controlled by the computer system, change detection means connected to said plurality of signal source means for generating an interrupt signal in response to either change in output signal of any one of said signal source means, means responsive to an interrupt signal generated by said change detection means for causing interruption of the main program and performance of an appropriate subprogram in the process control computer system, and indicator means connected to said plurality of signal source means and responsive to either change in output signal of any one of said signal source means for storing an indication that such a change has occurred.

10. In a process control computer system wherein the main program may be interrupted by a subprogram in response to an interrupt signal, the combination comprising: a plurality of signal source groups, each signal source group comprising a plurality of signal source means, each signal source means providing an output signal which changes between first and second states in response to corresponding predetermined changes in a selected parameter of the process being controlled by the computer system, change detection means connected to said signal source groups for generating an interrupt signal in response to either change in output signal of any one of said signal source means, means responsive to an interrupt signal generated by said change detection means for causing interruption of the main program and performance of an appropriate subprogram in the process control computer system, and a plurality of indicator means, each indicator means being connected to one of said signal source groups and responsive to either change in output signal of any one of said signal source means of the corresponding signal source group for storing an indication that such a change has occurred.

11. In a process control computer system for normally performing a main program and for selectively interrupting the main program to perform a comparison subprogram which compares the present and past states of the output signals of each of a plurality of signal source means to detect a change in state of one or more output signals, the combination comprising: a plurality of signal source means, each signal source means providing an output signal which changes between first and second states in response to corresponding predetermined changes in a selected parameter of the process being controlled by the computer system, change detection means connected to said plurality of signal source means for generating an interrupt signal in response to either change in output signal of any one of said plurality of signal source means, and means responsive to an interrupt signal generated by said change detection means for causing interruption of the main program and performance of the comparison program in the process control compter system.

12. In a process control computer system, the combination comprising: signal source means for providing an output signal which changes between first and second states in response to corresponding predetermined changes in a selected parameter of the process being controlled by said computer system, relay means having first and second contacts, means connecting said signal source means to said relay means for causing said relay means to assume a first state in response to one state of the output signal of said signal source means and to assume a second state in response to the other state of the output signal of said signal source means, means for applying a predetermined signal level to said first contact of said relay means, program interrupt means connected to said second contact of said relay means, and means included in said relay means for causing said first and second contacts to be momentarily electrically connected in response to a change in state of the output signal of said signal source means, whereby said predetermined signal level is applied to said program interrupt means connected to said second contact.

13. In a process control computer system, the combination comprising: an electrical contact which changes state in response to a predetermined change in a selected parameter of the process being controlled by said computer system, relay means having first and second contacts, one of said contacts being normally open and the other of said contacts being normally closed, means connecting said electrical contact to said relay means for causing said relay means to change its state of energization upon a change in state of said electrical contact, means for applying a predetermined signal level to said first contact of said relay means, circuit means connected to said second contact of said relay means, and means included in said relay means for causing said first and second contacts to be momentarily electrically connected during a change in state of energization of said relay means whereby said predetermined signal level is applied to said circuit means connected to said second contact.

14. In a process control computer system wherein the main program may be interrupted by a subprogram in response to an interrupt signal, the combination comprising: signal source means for providing one of two possible output signals and for changing between first and second output signals in response to corresponding predetermined changes in a selected parameter of the process being controlled by said computer system, relay means having first and second contacts, means connecting said signal source means to said relay means for causing said relay means to assume a first state in response to one output signal of said signal source means and to assume a second state in response to the other output signal of said signal source means, means for applying a predetermined signal level to said first contact of said relay means, means included in said relay means for causing said first and second contacts to be momentarily electrically connected during a change in state of said relay means, whereby said predetermined signal level is momentarily applied to said second contact, logic means connected to said second contact of said relay means and responsive to the predetermined signal level for generating an interrupt signal, and program interrupt means for causing interruption of the main program and performance of a subprogram in the process control computer system in response to the interrupt signal generated by said logic means.

References Cited

UNITED STATES PATENTS

| 3,048,332 | 8/1962 | Brooks et al. | 340—172.5 X |
| 3,192,508 | 6/1965 | Laning | 340—172.5 |
| 3,208,048 | 9/1965 | Kilburn et al. | 340—172.5 |
| 2,221,309 | 11/1965 | Behghiat | 340—172.5 |
| 3,222,647 | 12/1965 | Strachey | 340—172.5 |
| 3,243,781 | 3/1966 | Ehrman et al. | 340—172.5 |

ROBERT C. BAILEY, *Primary Examiner.*

PAUL J. HENON, *Examiner.*